(12) United States Patent
Sella et al.

(10) Patent No.: US 7,748,732 B2
(45) Date of Patent: Jul. 6, 2010

(54) AIRBAG COVER TEAR SEAM

(75) Inventors: Terry Sella, Reese, MI (US); Beth Hoffmann, Auburn Hills, MI (US); Mike Kutchey, Macomb, MI (US)

(73) Assignee: Autoliv ASP, Inc., Ogden, UT (US)

( * ) Notice: Subject to any disclaimer, the term of this patent is extended or adjusted under 35 U.S.C. 154(b) by 309 days.

(21) Appl. No.: 11/593,769

(22) Filed: Nov. 7, 2006

(65) Prior Publication Data

US 2008/0106076 A1 May 8, 2008

(51) Int. Cl.
*B60R 21/215* (2006.01)
(52) U.S. Cl. .................................................. 280/728.3
(58) Field of Classification Search ............... 280/728.3, 280/743.1, 743.2
See application file for complete search history.

(56) References Cited

U.S. PATENT DOCUMENTS

| | | | | |
|---|---|---|---|---|
| 5,096,220 A | * | 3/1992 | Nakajima | 280/728.3 |
| 5,221,108 A | * | 6/1993 | Hirabayashi | 280/728.3 |
| 6,070,904 A | * | 6/2000 | Ozaki et al. | 280/743.1 |
| 6,099,026 A | * | 8/2000 | Ando et al. | 280/728.3 |
| 6,168,189 B1 | | 1/2001 | Dennis | 280/728.3 |
| 6,505,850 B2 | | 1/2003 | Helfrich et al. | 280/728.3 |
| 6,634,670 B1 | | 10/2003 | Ellerbrok et al. | 280/743.1 |
| 6,682,093 B2 | * | 1/2004 | Tajima et al. | 280/732 |
| 7,025,374 B2 | | 4/2006 | Evans | 280/728.3 |
| 7,357,408 B2 | * | 4/2008 | Hall et al. | 280/728.2 |
| 2003/0019535 A1 | | 1/2003 | Brown et al. | |
| 2006/0192373 A1 | * | 8/2006 | Manley | 280/743.1 |
| 2007/0040368 A1 | * | 2/2007 | Manley | 280/743.2 |

OTHER PUBLICATIONS

Notification of Transmittal of the International Search Report and the Written Opinion of the International Searching Authority issued May 7, 2008 in International Application No. PCT/US2007/081789.

* cited by examiner

*Primary Examiner*—Paul N Dickson
*Assistant Examiner*—Nicole Verley
(74) *Attorney, Agent, or Firm*—Sally J Brown; Stoel Rives, LLP

(57) ABSTRACT

An tear seam in a cover of an airbag includes multiple, non-intersecting slits defined in a fabric of the cover that may be woven with weft yarns oriented generally parallel to a longitudinal axis and warp yarns oriented generally transverse thereto. The multiple slits are diagonal with respect to the longitudinal axis and include end portions. The end portions of substantially all adjacent slits mutually overlap, to weaken the strength of the fabric along the tear seam.

29 Claims, 3 Drawing Sheets

AIRBAG COVER TEAR SEAM

TECHNICAL FIELD

The present disclosure relates generally to the field of automotive protective airbags and devices. More specifically, the present disclosure relates to an airbag cover tear seam and affiliated airbag system.

BRIEF DESCRIPTION OF THE DRAWINGS

Understanding that the drawings depict only typical embodiments and are not therefore to be considered limiting, the embodiments will be described and explained with additional specificity and detail through the use of the accompanying drawings, in which like components are designated by like numerals throughout.

DETAILED DESCRIPTION OF EXEMPLARY EMBODIMENTS

The present disclosure relates to airbag covers, wrapper, or cushions that need to yield to an airbag when deployed. Deployment of an airbag generally occurs by rapid insertion of an inflation fluid into the airbag, which then rips or tears through part of a vehicle's interior to arrest an occupant's movement. The airbag may rip or tear through a steering wheel column, dash board, roof rail, seat cushion, or through some part of the interior trim of the vehicle. When the airbag is stored within one of these structures, it may be stored or packed within a cover or as a cushion having a cover, and may be stored in a tight space. The airbag is usually, therefore, very compact and needs to deploy through a small space. The airbag cover usually includes a tear seam to facilitate proper release of the airbag. Skilled persons will appreciate that the airbag cover referred to herein is the wrapper, usually of fabric, that contains the folded airbag and that prevents the airbag from getting out of shape while in the folded state.

An airbag system is designed so that the airbag, upon inflation, escapes the structure holding it, including the airbag cover. Partial or improper tearing may cause skewed deployments of the airbag. An ineffective tear seam on the cover or cushion may cause the airbag to either not inflate or to inflate improperly, thereby not effectively arresting an occupant's movement during impact.

Figure 1:
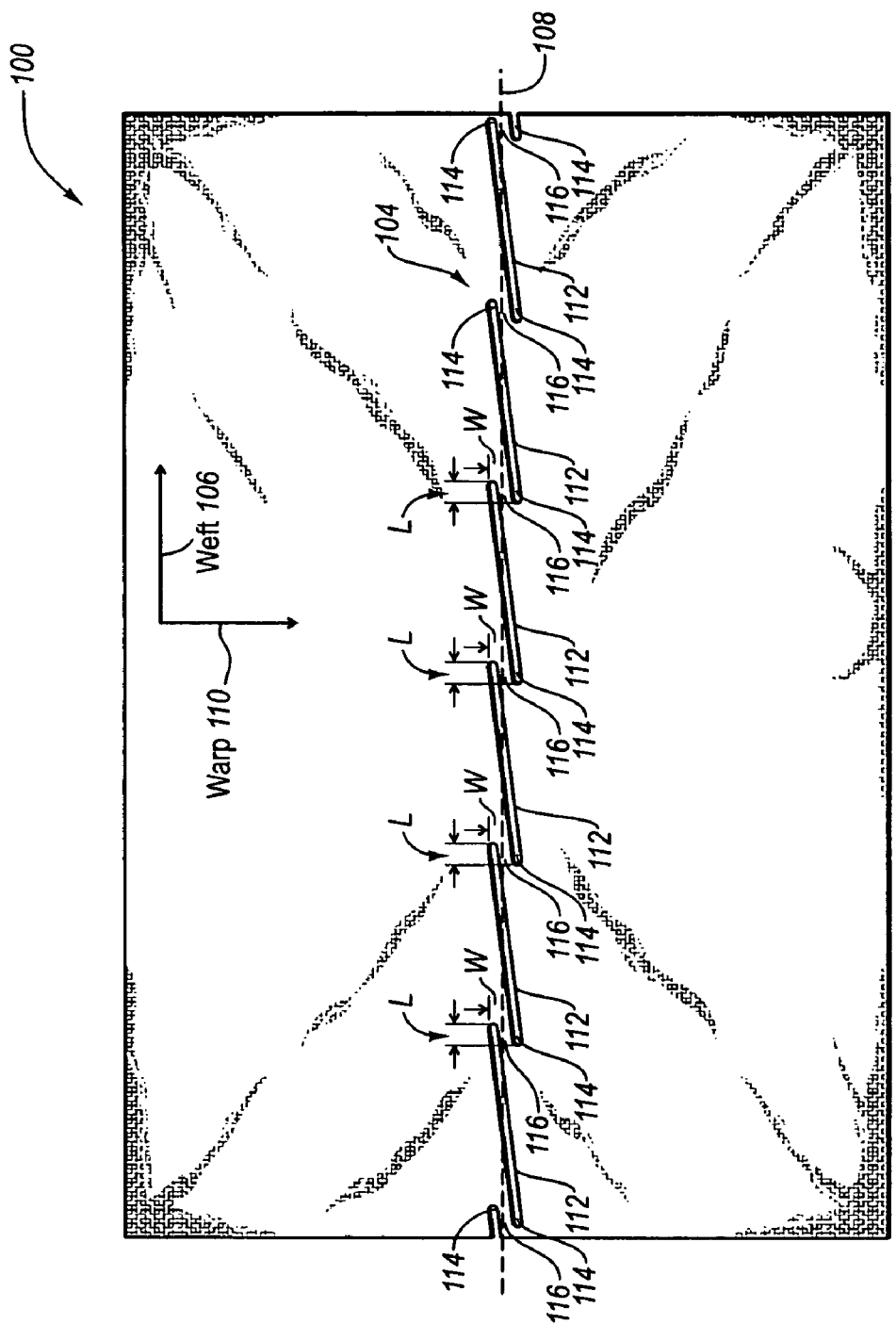
FIG. 1 is plan view of an airbag cover having a breakable tear seam.

With reference to the accompanying drawings, FIG. 1 is a plan view of an airbag cover 100 having a breakable tear seam 104. The tear seam 104 is made to rupture upon inflation of an airbag (300 in FIGS. 3 and 4). The cover 100 may be made of any material such as a fabric. For instance, the cover 100 may be made of a resilient woven material, which may include nylons, polymers, polyesters, or combinations thereof. The cover 100 may be formed at about a 630 denier or greater. Other configurations, however, are also acceptable.

If woven, the fabric includes a plurality of weft yarns 106 oriented generally along a longitudinal axis 108, alternately woven with a plurality of warp yarns 110 oriented generally transverse to the longitudinal axis 108. Skilled persons will appreciate that the tear seam 104 may be oriented either along the warp yarns 110 or the weft yarns 106, and therefore the latter may be interchangeable as referred to herein. Reference to weft yarns 106 as being generally parallel to the longitudinal axis 108, therefore, is for ease of discussion and not meant to be limiting where the warp yarns 110 may alternatively be oriented along the longitudinal axis 108.

The tear seam 104 is created by forming a plurality of spaced-apart, intermittent slits 112 that are diagonally positioned relative to each other and to the longitudinal axis 108. The plurality of slits 112 may be created such that the tear seam 104 generally follows a line, which line may be substantially straight (as shown in longitudinal axis 108), or which may be curved or of a specified pattern to accommodate different types and sizes of deployable airbags. Therefore, one non-exclusive embodiment of the tear seam 104 is one that appears along a straight, longitudinal axis 108.

The slits 112 are non-intersecting, yet overlap at end portions 114 thereof, such that a plurality of connected portions 116 are present between adjacent, overlapping end portions 114. Each connected portion 116 has a length L, which dictates the strength of the tear seam 104, and a width W that also affects the strength of the tear seam 104, wherein decreasing the width W may reduce the strength of the tear seam 104. The length L may be determined along each slit 112, or may alternatively be measured along the longitudinal axis 108. Connected portions 116 may optionally be of an equal length L. The length L is generally shorter than the length of slits 112, but in one embodiment, may be close to the length of slits 112. For instance, the slit 112 length may be approximately eight times (or greater) than the length L of the connected portions 116. Use of a fabric (or other material) with a high tensile strength may prevent predictable cushion deployments, e.g. the fabric does not tear or the airbag deployment is skewed. Additionally, if the connected portions 116 are too short in length L or width W, then there is a risk of defective airbag systems being produced where the tear seam 104 may prematurely break or tear during production, handling, or installation.

The shape and length of the tear seam 104 is influenced by the type and size of the airbag to be used with the airbag cover 100 as well as the type of material used to produce the airbag cover 100. Use of certain fabric materials, such as nylon 6/6 at a 630 or similar denier, for instance, and defining connected portions 116 of a calculated length L and width W allows creating a tear seam 104 that will rupture with reduced strength while remaining strong enough to avoid premature breaking. Reducing strength while avoiding premature tearing is accomplished at least partly through use of a diagonal pattern in the plurality of slits 112. The predetermined design of the quantity and length L (and/or width W) of the connected portions 116 also contribute to achieving the desired balance of strength reduction while avoiding premature tearing. In this way, the connected portions 116 are adjustable to custom build a tear seam 104 requiring a predetermined strength for rupturing. For instance, a greater quantity of connected portions 116 and/or longer connected portions will increase the strength needed to rupture the tear seam 104.

In addition, warp 110 yarns of the fabric that were previously continuous, are severed on either side of the connected portions 116 when the slits 112 are formed. The slits 116 themselves make discontinuous the weft yarns 106 along a tear seam 104 oriented generally parallel to the longitudinal axis 108. Pre-cutting the continuous threads 106, 110 reduces the tensile resistance of the fabric along the tear seam 104 and especially in the connected portions 116.

Figure 2:
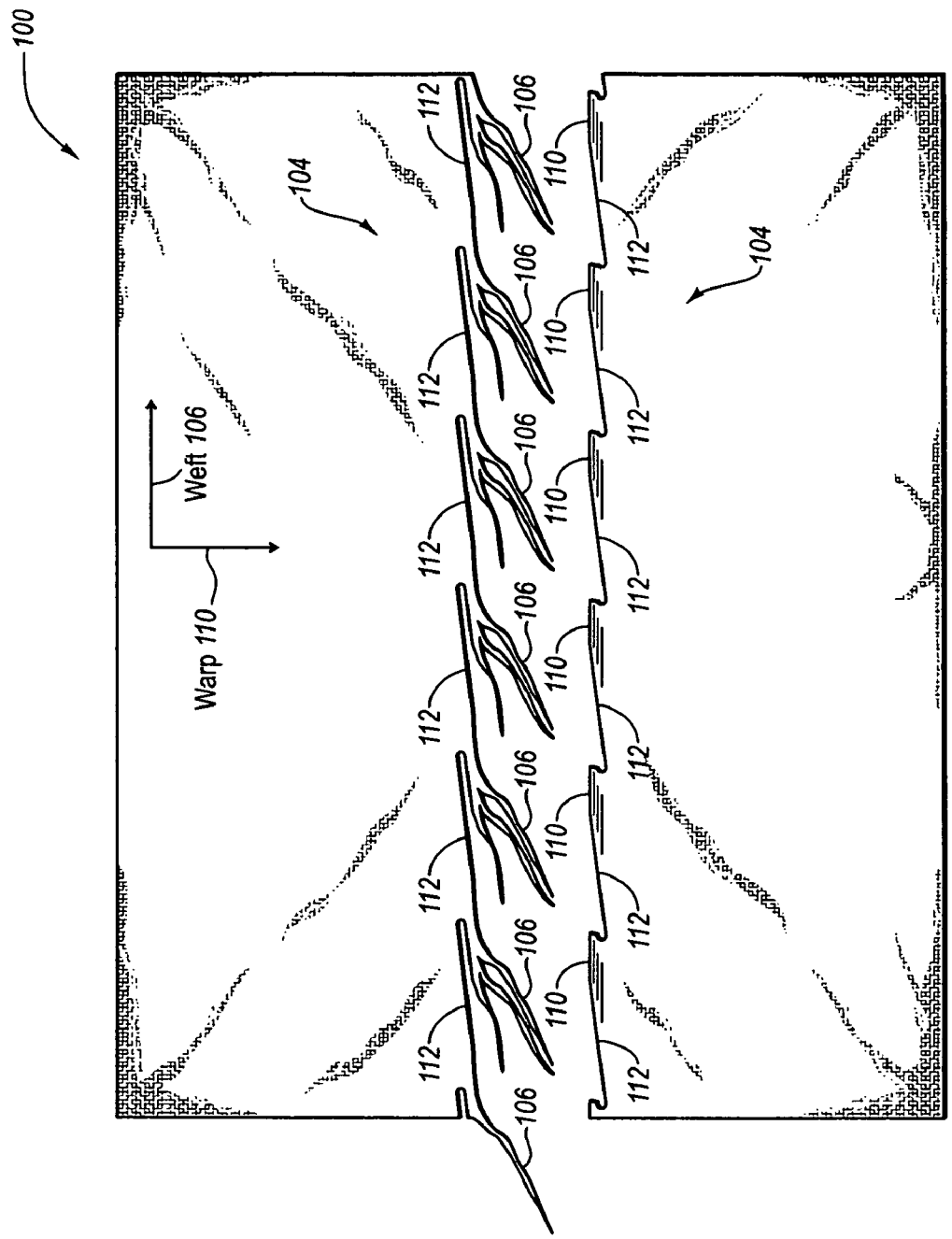
FIG. 2 is a plan view of the airbag cover made of fabric with the tear seam ruptured.

FIG. 2 is a plan view of the airbag cover fabric of FIG. 1 with the tear seam 104 ruptured, for instance, after airbag deployment. In this embodiment, the airbag cover 100 is made out of woven fabric. As shown, the tear seam 104 does not undergo a clean break, but is pulled apart as a plurality of weft yarns 106 are released or pulled out from a plurality of warp yarns 110 at each of the connected portions 116. A plurality of tears results generally parallel to the warp yarns 110 between end portions 114, and thus within each connected portion 116.

Through predetermined design of the slits 112, having a specified length L (and/or width W) of a specified quantity of connected portions 116, an airbag cover 100 may be formed such that the strength to rupture the tear seam 104 with an airbag deployment is reduced, and yet simultaneously controlled. This allows a more predictable and repeatable airbag deployment. The force required to tear apart the seam 110 may be fine-tuned by changing the length L, width W, and quantity of the connected portions 116 between the plurality of slits 112.

Figure 3:
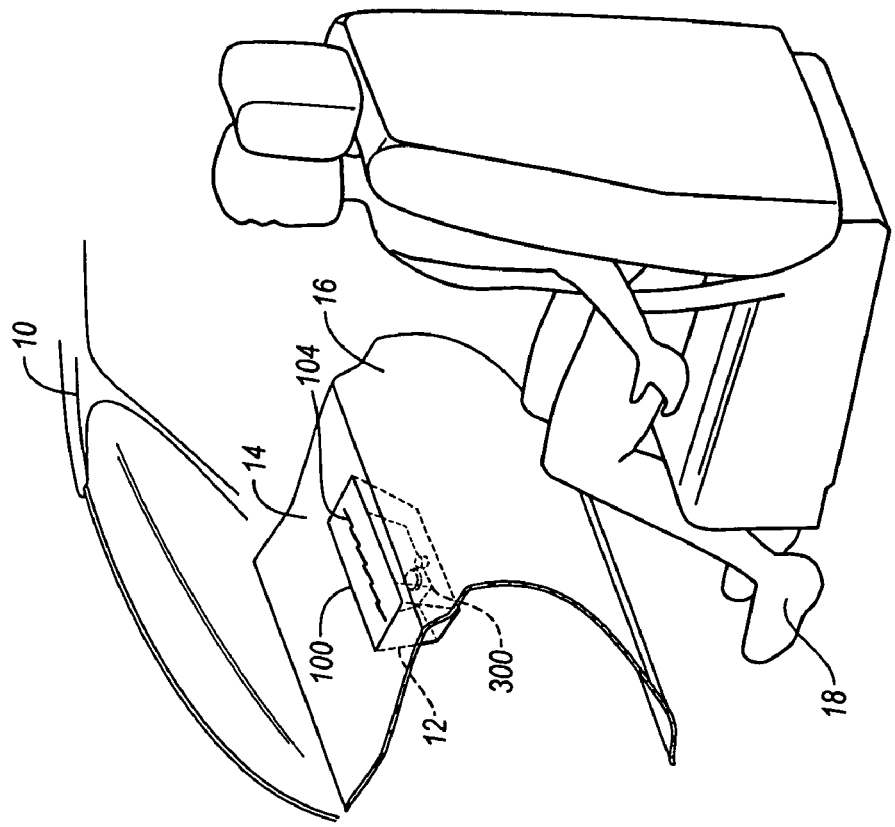
FIG. 3 is a perspective view of a stowed airbag within an airbag cover of the present disclosure.

FIG. 3 is a perspective view of a stowed airbag 300 within an airbag cover 100. An airbag system thus may comprise the airbag 300 stored in the airbag cover 100 of a particular material and defining a tear seam 104 proximate the area of a vehicle 10 into which the airbag 300 would deploy in the case of an accident. While the airbag 300 is depicted stored within a container 12 of a front dash 14 of the vehicle 10, one skilled in the art will appreciate that the airbag 300 may be stored in a variety of locations, as previously discussed. Part of a trim panel 16 of the vehicle 10, or front dash 14, for instance, may also be configured to give way (away from a vehicle occupant 18) when the tear seam 104 ruptures so that the tear seam 104 is not visible from the inside of the vehicle 10.

Figure 4:
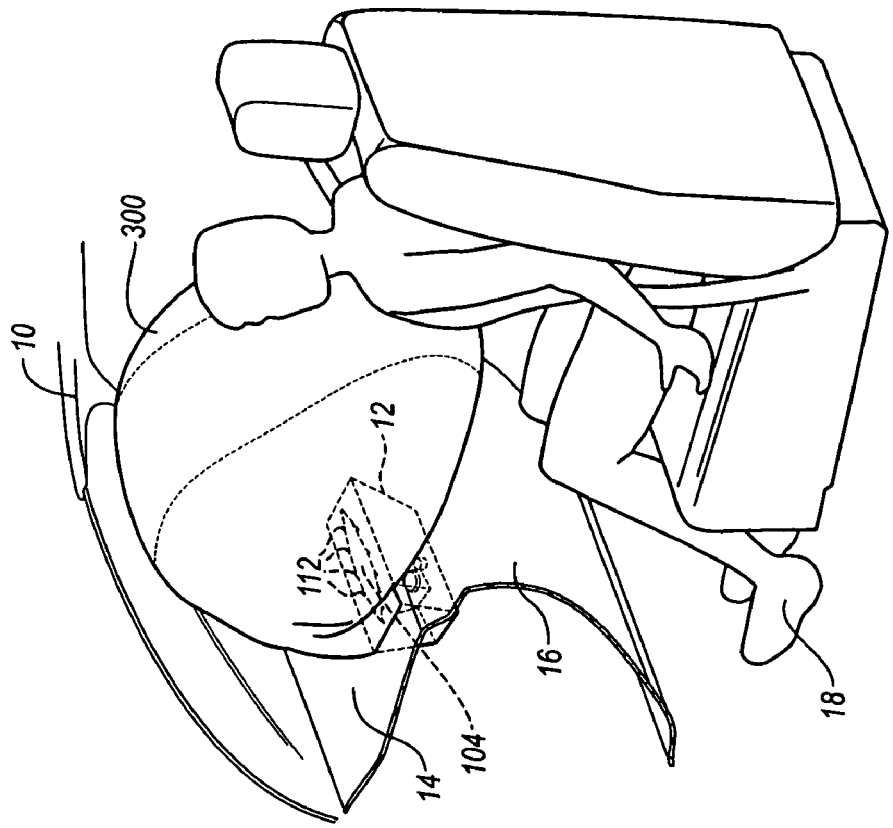
FIG. 4 is a perspective view of the airbag of FIG. 3 after deployment through a tear seam of the present disclosure.

FIG. 4 is a perspective view of the airbag 300 of FIG. 3 after deployment through the tear seam 104. Note that the tear seam 104 has ruptured in an even manner and completely across the plurality of slits 112 so that the airbag 300 did not skew during deployment. The airbag 300, therefore, has squarely deployed to the front of the vehicle occupant 18 and arrested his or her forward movement. Prevention of skewing in the embodiment of FIGS. 3 and 4 is desirable because of the placement and intended use of airbag 300. Skilled persons, however, will appreciate that a different placement and intended application may result in a need for a skewed deployment, in which case the plurality of slits 112 may be customized across the tear seam 104 in varying the length L and width W of the various connected portions 116.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims.

What is claimed is:

1. A tear seam in a cover of an airbag, comprising:
   a plurality of non-intersecting slits defined in a woven fabric of a cover that is woven with weft yarns oriented generally parallel to a longitudinal axis and warp yarns oriented generally transverse thereto,
      wherein the plurality of slits are diagonal with respect to the longitudinal axis,
      wherein the plurality of slits are positioned such that adjacent slits have a pair of overlapping end portions,
      wherein each pair of overlapping end portions defines a connected portion therebetween in which the warp yarns do not continue beyond the respective pair of overlapping end portions and some of the weft yarns continue beyond the respective pair of overlapping end portions below one adjacent slit and above the other adjacent slit, and
      wherein inflation of an airbag against the cover results in the separation of the weft yarns from the warp yarns along the plurality of slits without similarly separating the weft yarns from the warp yarns at the connected portions, thereby forming a plurality of tears.

2. The tear seam of claim 1, wherein the fabric comprises nylon.

3. The tear seam of claim 1, wherein the fabric comprises a polymer.

4. The tear seam of claim 1, wherein the fabric comprises yarn of at least 630 denier.

5. The tear seam of claim 1, wherein when the tear seam ruptures, the plurality of tears are generally parallel to the weft yarns that are above and below the plurality of slits.

6. The tear seam of claim 1, wherein the plurality of slits are oriented mutually parallel to each other along the longitudinal axis.

7. An airbag cover comprising:
   a woven fabric comprising weft yarns running generally parallel to a longitudinal axis and warp yarns woven generally transverse therein; and
   a tear seam comprising a plurality of slits defined in the fabric in spaced-apart orientation,
      wherein the plurality of slits comprising adjacent slits that overlap each other at their respective end portions,
      wherein the overlapping end portions of two adjacent slits define a connected portions in which the warp yarns do not continue beyond the overlapping end portions of the two adjacent slits and some of the weft yarns continue beyond the overlapping end portions of the two adjacent slits below one adjacent slit and above the other adjacent slit,
      wherein each connected portion has a length L and a width W, and wherein width W is not significantly greater than length L such that the slits are slightly diagonal with respect to the longitudinal axis,
      wherein inflation of an airbag against the cover results in the separation of the weft yarns from the warp yarns along the plurality of slits without similarly separating the weft yarns from the warp yarns at the connected portions, thereby rupturing the tear seam through which the airbag deploys.

8. The airbag cover of claim 7, wherein the fabric comprises a material selected from the group consisting of nylon, polymer, polyester, and combinations thereof.

9. The airbag cover of claim 8, wherein the fabric comprises yarn of at least 630 denier.

10. The airbag cover of claim 7, wherein the overlapping end portions are substantially parallel.

11. The airbag cover of claim 7, wherein the length L of each connected portion at least partially determines the strength required to rupture the tear seam.

12. The airbag cover of claim 7, wherein the slit length exceeds the length L of at least some of the plurality of connected portions.

13. The airbag cover of claim 7, wherein upon rupturing, the tear seam forms a plurality of tears oriented generally parallel to the weft yarns.

14. The airbag cover of claim 7, wherein the width W of each connected portion at least partially determines the strength required to rupture the tear seam.

15. An airbag system comprising:
an inflatable airbag;
an airbag cover comprising a woven fabric of a cover that is woven with weft yarns oriented generally parallel to a longitudinal axis and warp yarns oriented generally transverse thereto; and
a tear seam defined in the woven fabric comprising a plurality of spaced-apart, slits cut in the woven fabric such that each slit has opposing first and second sides,
wherein the plurality of slits are diagonal with respect to the longitudinal axis such that each slit is defined by discontinuous segments of the weft yarns and warp yarns,
wherein the plurality of slits are positioned such that adjacent slits have a pair of overlapping end portions, and
wherein each pair of overlapping end portions defines a connected portion therebetween in which the warp yarns do not continue beyond the respective pair of overlapping end portions and some of the weft yarns continue beyond the respective pair of overlapping end portions below one adjacent slit and above the other adjacent slit,
wherein inflation of an airbag against the cover causes the tear seam to rupture such that the woven fabric is divided into a first section and a second section to allow the deployment of the airbag through the airbag cover,
wherein the first section comprises the first side of each slit and the connected portions with the discontinuous segments of the weft yarns that previously defined the opposing second side of each respective slit extending from each of the connected portions,
wherein the second section comprises the discontinuous segments of the warp yarns of the second side of each slit as the discontinuous segments of the weft yarns that defined the second side of each slit and the discontinuous segments of the warp yarns that defined the second side of each slit have been pulled clear of each other.

16. The airbag system of claim 15, wherein the tear seam after rupturing is generally parallel to the weft yarns that are above and below the plurality of slits.

17. The airbag system of claim 15, wherein the fabric comprises a material selected from the group consisting of nylon, polymer, polyester, and combinations thereof.

18. The airbag system of claim 15, wherein the fabric comprises yarn of at least 630 denier.

19. The airbag system of claim 15, wherein the connected portions are of a length along the longitudinal axis that at least partially determines the strength required to rupture the tear seam.

20. The airbag system of claim 15, wherein the plurality of connected portions are of a width between the overlapping end portions that at least partially determines the strength required to rupture the tear seam.

21. The airbag system of claim 15, wherein each connected portion has a length L and a width W, and wherein the length L is greater than the width W.

22. The airbag system of claim 15, wherein each the tear seam further comprises a plurality of connected portions between overlapping end portions of the plurality of slits, wherein the connected portions are defined by a length along the longitudinal axis which is less than the length of at least some of the plurality of slits.

23. The airbag system of claim 15, wherein the each connected portion has a length L and a width W, and wherein width W is not significantly greater than length L.

24. An airbag cover comprising:
a portion of a woven fabric configured to contain a folded airbag therein, wherein the woven fabric is woven with weft yarns oriented generally parallel to a longitudinal axis and warp yarns oriented generally transverse thereto; and
a tear seam defined in the woven fabric comprising a plurality of spaced-apart, slits cut in the woven fabric such that each slit has opposing first and second sides,
wherein the plurality of slits are diagonal with respect to the longitudinal axis such that each slit is defined by discontinuous segments of the weft yarns and warp yarns,
wherein the plurality of slits are positioned such that adjacent slits have a pair of overlapping end portions, and
wherein each pair of overlapping end portions defines a connected portion therebetween in which the warp yarns do not continue beyond the respective pair of overlapping end portions and some of the weft yarns continue beyond the respective pair of overlapping end portions below one adjacent slit and above the other adjacent slit,
wherein inflation of an airbag against the cover causes the tear seam to rupture such that the woven fabric is divided into a first section and a second section to allow the deployment of the airbag through the airbag cover,
wherein the first section comprises the first side of each slit and the connected portions with the discontinuous segments of the weft yarns that previously defined the opposing second side of each respective slit extending from each of the connected portions,
wherein the second section comprises the discontinuous segments of the warp yarns of the second side of each slit as the discontinuous segments of the weft yarns that defined the second side of each slit and the discontinuous segments of the warp yarns that defined the second side of each slit have been pulled clear of each other.

25. The airbag cover of claim 24, wherein the tear seam after rupturing is generally parallel to the weft yarns that are above and below the plurality of slits.

26. The airbag cover of claim 24, wherein the woven fabric comprises a material selected from the group consisting of nylon, polymer, polyester, and combinations thereof.

27. The airbag cover of claim 26, wherein the woven fabric comprises yarn of about 630 denier.

28. The airbag cover of claim 24, wherein the each connected portion has a length L and a width W, and wherein the length L is greater than the width W.

29. The airbag cover of claim 24, wherein the each connected portion has a length L and a width W, and wherein width W is not significantly greater than length L.

* * * * *